(12) United States Patent
Aitharaju et al.

(10) Patent No.: US 11,453,284 B2
(45) Date of Patent: Sep. 27, 2022

(54) LIGHTWEIGHT, SINGLE-PIECE ENERGY ABSORBING AND INTRUSION RESISTANT BATTERY TRAY FOR A VEHICLE

(71) Applicant: GM GLOBAL TECHNOLOGY OPERATIONS LLC, Detroit, MI (US)

(72) Inventors: Venkateshwar R. Aitharaju, Troy, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 214 days.

(21) Appl. No.: 16/916,626

(22) Filed: Jun. 30, 2020

(65) Prior Publication Data

US 2021/0402861 A1 Dec. 30, 2021

(51) Int. Cl.

| | |
|---|---|
| *B60K 1/04* | (2019.01) |
| *B62D 25/20* | (2006.01) |
| *B62D 21/15* | (2006.01) |
| *B62D 21/17* | (2006.01) |
| *B62D 21/02* | (2006.01) |
| *H01M 50/20* | (2021.01) |
| *H01M 50/24* | (2021.01) |

(52) U.S. Cl.
CPC ............... *B60K 1/04* (2013.01); *B62D 21/02* (2013.01); *B62D 21/15* (2013.01); *B62D 21/17* (2013.01); *B62D 25/2009* (2013.01); *H01M 50/20* (2021.01); *H01M 50/24* (2021.01); *B60K 2001/0405* (2013.01); *H01M 2220/20* (2013.01)

(58) Field of Classification Search
CPC ........ B60K 1/04; H01M 50/20; H01M 50/24; B62D 21/02; B62D 21/15
See application file for complete search history.

(56) References Cited

U.S. PATENT DOCUMENTS

| | | | |
|---|---|---|---|
| 5,039,567 A | 8/1991 | Landi et al. | |
| 5,110,653 A | 5/1992 | Landi | |
| 5,581,468 A | 12/1996 | White et al. | |
| 5,830,548 A | 11/1998 | Andersen et al. | |
| 5,879,780 A | 3/1999 | Kindinger et al. | |
| 7,819,462 B1 | 10/2010 | Owens | |
| 8,033,592 B2 | 10/2011 | Hsu et al. | |

(Continued)

FOREIGN PATENT DOCUMENTS

| | | |
|---|---|---|
| CN | 110194114 A | 9/2019 |
| CN | 110195757 A | 9/2019 |

(Continued)

OTHER PUBLICATIONS

Newcomb, Bradley A. et al., U.S. Appl. No. 16/695,855, filed Nov. 26, 2019 entitled, 1 Corrugated Hollow Structures and Two-Step Molding of Corrugated Hollow Structures, 52 pages.

(Continued)

*Primary Examiner* — James A English
*Assistant Examiner* — James J Triggs
(74) *Attorney, Agent, or Firm* — Vivacqua Crane PLLC (57) ABSTRACT

A single-piece, lightweight, energy-absorbing, and impact resistant battery tray for a battery enclosure for a vehicle includes a lower floor including an impact resisting structure, upwardly sloping side walls integrally formed with the lower floor, and a peripheral flange integrally formed with the upwardly sloping side walls and including an energy absorbing structure.

18 Claims, 5 Drawing Sheets

(56) References Cited

U.S. PATENT DOCUMENTS

| | | |
|---|---|---|
| 8,109,492 B2 | 2/2012 | Winocur |
| 8,148,455 B2 | 3/2012 | Posudievsky et al. |
| 8,309,644 B1 | 11/2012 | Huang |
| 8,481,170 B2 | 7/2013 | Vanimisetti et al. |
| 8,606,232 B2 | 12/2013 | Engertsbergrer et al. |
| 8,961,724 B2 | 2/2015 | Polewarczyk et al. |
| 9,227,673 B2 | 1/2016 | Berger et al. |
| 9,399,490 B2 | 7/2016 | Aitharaju et al. |
| 9,650,003 B2 | 5/2017 | Owens et al. |
| 9,669,787 B2 | 6/2017 | Nishimura et al. |
| 9,937,781 B1 | 4/2018 | Bryer et al. |
| 10,144,376 B2 | 12/2018 | Aitharaju et al. |
| 10,308,201 B2 | 6/2019 | Newcomb et al. |
| 10,661,646 B2 | 5/2020 | Matecki et al. |
| 2006/0106147 A1 | 5/2006 | Fasulo et al. |
| 2006/0199890 A1 | 9/2006 | Fasulo et al. |
| 2007/0063393 A1 | 3/2007 | Vernin et al. |
| 2007/0299185 A1 | 12/2007 | Ottaviani et al. |
| 2010/0098925 A1 | 4/2010 | Fasulo et al. |
| 2011/0121225 A1 | 5/2011 | Posudievsky et al. |
| 2012/0099941 A1 | 4/2012 | Larsh et al. |
| 2012/0213997 A1 | 8/2012 | Wang et al. |
| 2013/0022780 A1 | 1/2013 | Kawazoe et al. |
| 2014/0105703 A1 | 4/2014 | Kvilhaug et al. |
| 2014/0339036 A1 | 11/2014 | Arai et al. |
| 2015/0136013 A1 | 5/2015 | Preisler et al. |
| 2016/0001816 A1 | 1/2016 | Aitharaju et al. |
| 2016/0264082 A1 | 9/2016 | Berger et al. |
| 2016/0356334 A1 | 12/2016 | Onoue et al. |
| 2017/0361794 A1 | 12/2017 | Holderreid et al. |
| 2018/0029316 A1 | 2/2018 | Coppola et al. |
| 2018/0030922 A1 | 2/2018 | Kia et al. |
| 2018/0030923 A1 | 2/2018 | Coppola et al. |
| 2018/0030924 A1 | 2/2018 | Coppola et al. |
| 2018/0031027 A1 | 2/2018 | Coppola et al. |
| 2018/0169975 A1 | 6/2018 | Aitharaju et al. |
| 2019/0036092 A1* | 1/2019 | Günther ................ H01M 50/20 |
| 2019/0111872 A1 | 4/2019 | Newcomb et al. |
| 2019/0232903 A1 | 8/2019 | Newcomb et al. |
| 2019/0263342 A1 | 8/2019 | Rodgers et al. |
| 2019/0264769 A1 | 8/2019 | Gergely et al. |
| 2019/0308669 A1 | 10/2019 | Aitharaju et al. |

FOREIGN PATENT DOCUMENTS

| | | |
|---|---|---|
| CN | 110395320 A | 11/2019 |
| DE | 102019104724 A1 | 8/2019 |
| DE | 102019104731 A1 | 8/2019 |
| DE | 102019108434 A1 | 10/2019 |

OTHER PUBLICATIONS

Sabic©, "Sabic Developing New Thermoplastic Solutions for Electric, Connected and Autonomous Vehicles", [online] Jul. 5, 2018 [retrieved on Sep. 10, 2019]. Retrieved from the Internet <URL: https://www.sabic.com/en/news/12716-sabic-developing-new-thermoplastic-solutions-for-electric-connected-?nd-autonomous-vehicles>.

* cited by examiner

LIGHTWEIGHT, SINGLE-PIECE ENERGY ABSORBING AND INTRUSION RESISTANT BATTERY TRAY FOR A VEHICLE

FIELD

The present disclosure relates to a lightweight, single-piece energy-absorbing and intrusion resistant battery tray for a vehicle.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

A conventional battery electric vehicle (BEV) includes a battery pack which includes battery modules positioned within a battery enclosure. The battery enclosure provides support for the battery modules and also may provide some degree of protection against impact and/or intrusion. These battery enclosures may include a battery tray forming a lower portion of the battery enclosure. The battery tray typically is formed from multiple components such as, for example, a flat panel floor that is rigidly fixed to a support structure that surrounds a periphery of the battery tray. The support structure may include, for example extruded metallic channels which are bonded, riveted, fastened, or otherwise fixed to the flat panel floor. Therefore, conventional battery trays for a BEV are composed of multiple components which require manual assembly.

SUMMARY

In an exemplary aspect, a single-piece, lightweight, energy-absorbing, and impact resistant battery tray for a battery enclosure for a vehicle includes a lower floor including an impact resisting structure, upwardly sloping side walls integrally formed with the lower floor, and a peripheral flange integrally formed with the upwardly sloping side walls and including an energy absorbing structure.

In this manner, a vehicle may incorporate a battery enclosure which includes a lightweight battery tray that is formed of a single-piece and which incorporates both impact resistance and energy absorption characteristics while providing substantial structural support for battery modules arranged within the battery enclosure.

In another exemplary aspect, the upwardly sloping side walls define at least one pair of grooves.

In another exemplary aspect, each of the pair of grooves are defined by opposing walls of the upwardly sloping side walls.

In another exemplary aspect, the at least one pair of grooves are configured to receive at least one reinforcing cross-member.

In another exemplary aspect, the impact resisting structure includes, a first layer including continuous fibers embedded in a polymeric matrix, a second layer attached to a first side of the first layer and including flame resistant fibers, and a third layer attached to a second side of the first layer, opposite the first side, and including a fiber-reinforced polymer (FRP) corrugated structure.

In another exemplary aspect, the battery tray further includes a fracture detection circuit attached to the first layer or the third layer and configured to detect a break in the impact protection structure.

In another exemplary aspect, the fracture detection circuit includes an engineered pattern of electrical wires laminated to or embedded within the first layer.

In another exemplary aspect, the third layer includes the FRP corrugated structure, the FRP structure including a series of elongated, mutually parallel ridges.

In another exemplary aspect, the series of elongated, mutually parallel ridges has a sinusoidal-waveform profile or a polygonal-waveform profile.

In another exemplary aspect, the energy absorbing structure includes a housing includes a first wall and a second wall, the first wall and the second wall being spaced apart from one another to at least partially define an interior compartment, and a first plurality of discrete energy-absorbing elements each including a polymer and a plurality of reinforcing fibers, the first plurality of energy-absorbing elements being at least partially disposed within the interior compartment and fixed to the housing, each energy-absorbing element of the first plurality of energy-absorbing elements including an elongated hollow structure extending between a first end and a second end, the elongated hollow structure defining a longitudinal axis extending nonparallel to at least one of the first wall and the second wall.

In another exemplary aspect, the respective longitudinal axes of the first plurality of energy-absorbing elements extend substantially normal to at least one of the first wall and the second wall.

In another exemplary aspect, the elongated hollow structure of each energy-absorbing element of the first plurality of energy-absorbing elements defines a substantially circular cross section in a direction perpendicular to the respective longitudinal axis.

In another exemplary aspect, a peripheral wall of the elongated hollow structure of each energy-absorbing element of the first plurality of energy-absorbing elements defines a thickness that varies along the longitudinal axis.

In another exemplary aspect, the peripheral wall of the elongated hollow structure of each energy-absorbing element of the first plurality of energy-absorbing elements defines a first thickness at the first end, and the peripheral wall of the elongated hollow structure of each energy-absorbing element of the first plurality of energy-absorbing elements defines a second thickness at the second end, the second thickness being less than the first thickness, and the second end being disposed outward of the first end with respect to the vehicle.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Figure 1:
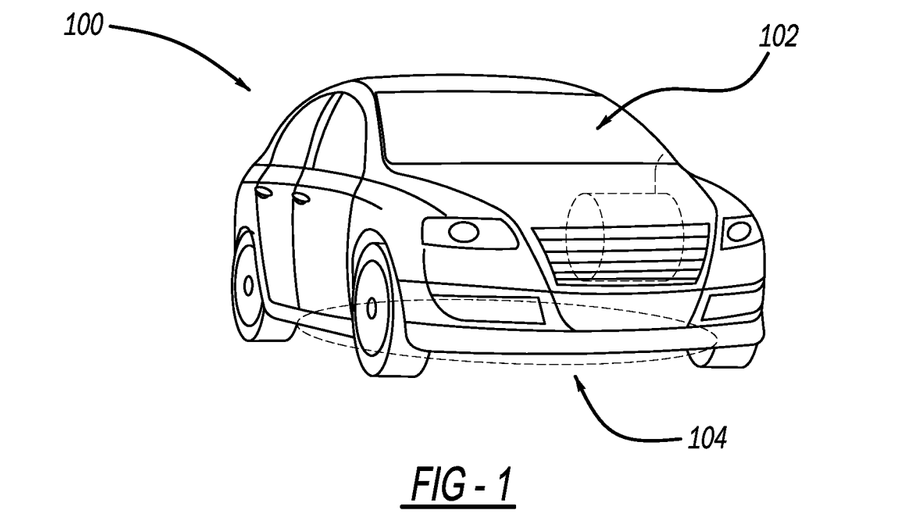
FIG. 1 illustrates a perspective view of a vehicle.
Figure 2:
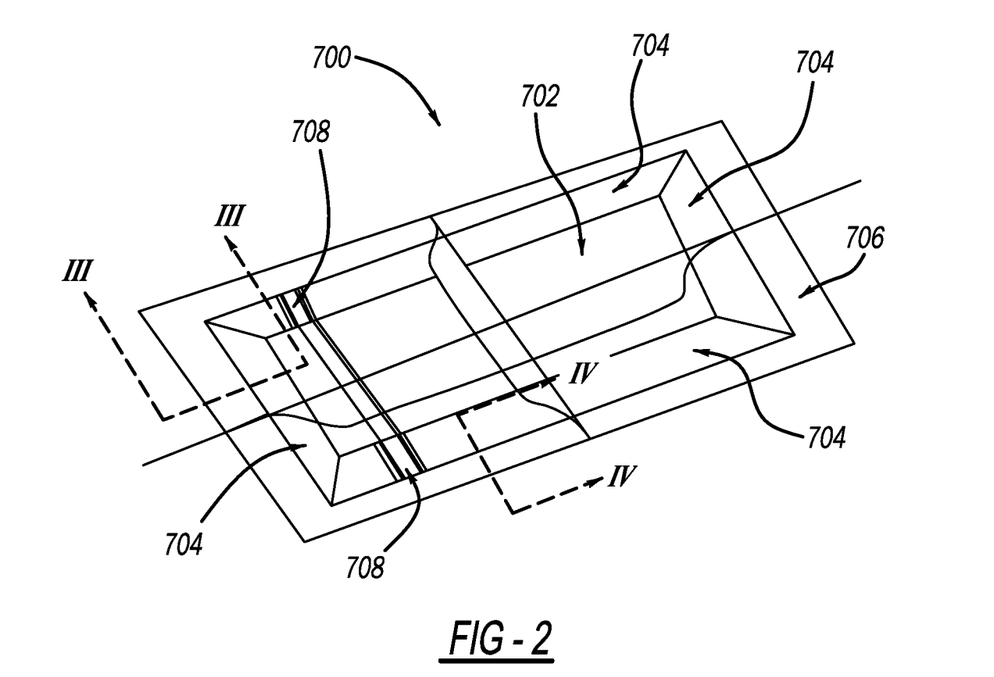
FIG. 2 illustrates a perspective view of an exemplary battery tray 700 in accordance with the present disclosure.

FIG. 1 illustrates a perspective view of a vehicle 100 including a passenger compartment 102 and a lower portion 104 in which a battery that is electrically coupled to one or more electric motors is positioned within a battery enclosure including a battery tray (not shown). The vehicle 100 may be, for example, a hybrid electric vehicle or a battery electric vehicle (BEV). FIG. 2 illustrates a perspective view of an exemplary battery tray 700 in accordance with the present disclosure. The battery tray 700 provides support and protection to battery modules (not shown) which may be used to operate a vehicle. The battery tray 700 is a single piece that includes a lower floor 702, upwardly sloping side walls 704, and a peripheral flange 706. The side walls 704 also form at least one pair of grooves 708 in which reinforcing cross-members (not shown) may be positioned to reinforce the structure of the battery tray 700 and also to provide horizontal support to maintain the position of the battery modules within the battery tray 700. The pair of grooves 708 may be formed in opposing portions of the side walls 704. Battery modules may rest on the lower floor 702 and be separated from each other and positioned relative to the battery tray by a reinforcing cross-member that is received by the pair of grooves 708. While the battery tray 700 includes only a single pair of grooves 708 it is to be understood that a battery tray in accordance with the present application may include a plurality of pairs of grooves 708.

Figure 3:
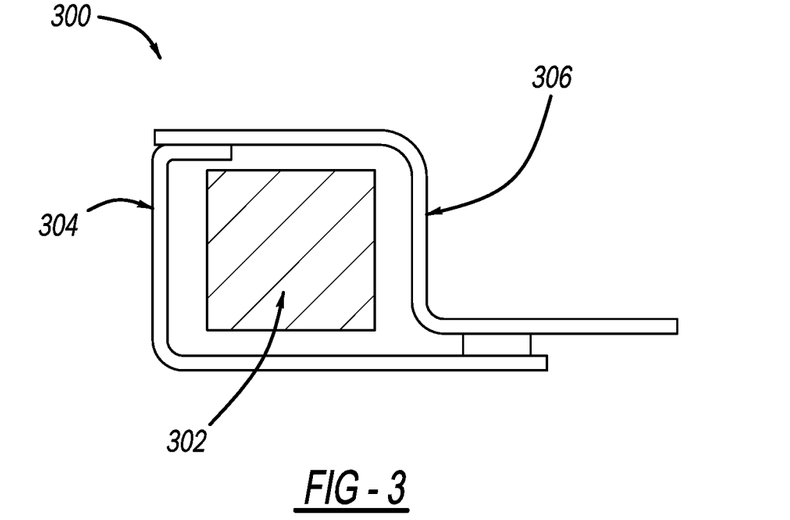
FIG. 3 is a cross-sectional view of the battery tray 700 taken along line III-Ill which illustrates a first exemplary energy absorber.
Figure 4:
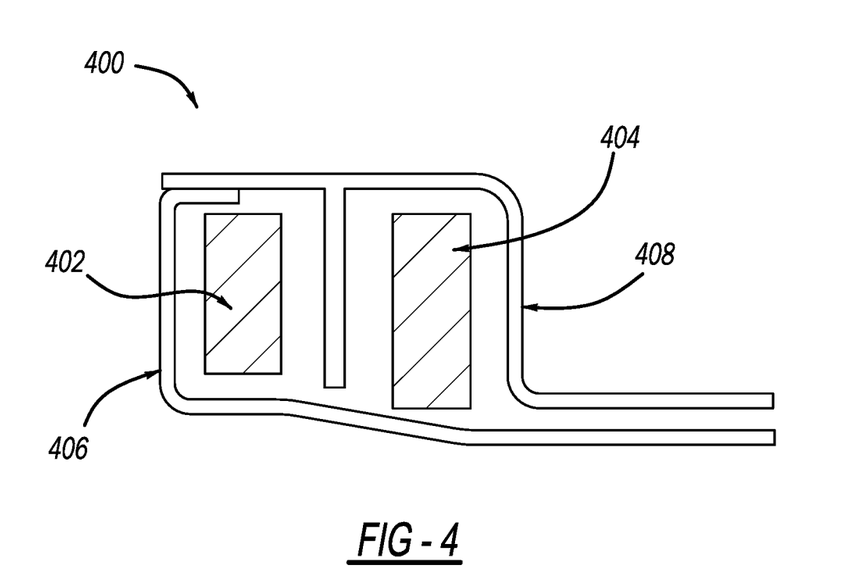
FIG. 4 is a cross-sectional view of the battery tray 700 taken along line IV-IV which illustrates a second exemplary energy absorber 400.

FIG. 3 is a cross-sectional view of the battery tray 700 taken along line III-Ill which illustrates a first exemplary energy absorber 300. The first energy absorber 300 is positioned along lateral sides of the peripheral flange 706 of the battery tray 700. The energy absorber 300 includes an energy absorbing portion 302 which is enclosed within first energy absorbing housing panels 304 and 306. FIG. 4 is a cross-sectional view of the battery tray 700 taken along line IV-IV which illustrates a second exemplary energy absorber 400. The second energy absorber 400 is positioned along longitudinal sides of the peripheral flange 206 of the battery tray 700. The second energy absorber 400 includes a first energy absorbing portion 402 and a second energy absorbing portion 404 which are enclosed within second energy absorbing housing panels 406 and 408. Each of the first energy absorbing portion 402 and second energy absorbing portion 404 may be configured to provide differing or similar levels of progressive energy absorptions characteristics. Since the second energy absorber 400 may include a plurality of energy absorbing portions, in the event of an vehicle impact, at least one of the energy absorbing portions may be left intact and the battery tray 300 may only require repair and/or replacement of one of the energy absorbing portions 402 or 404 thereby reducing the cost of repair.

Each of the first energy absorber 300 and the second energy absorber 400 provide impact resistance in in the event of a vehicle incorporating the battery tray 700 experiences an impact. The energy absorbers 300 and 400 are configured to absorb the energy of an impact event. Each of the energy absorbers 300 and 400 may be an energy absorber like that described in co-pending, U.S. patent application Ser. No. 15/907,036, the disclosure of which is incorporated in its entirety herein. For example, each of the energy absorbers 300 and 400 may be formed from an energy-absorbing assembly which includes a plurality of energy absorbing elements formed from or include a polymer and a plurality of reinforcing fibers. Each of the energy absorbing elements may define a plurality of ridges or peaks to form a corrugated or waveform structure. The thickness of the energy absorbing elements may vary between ends of each of the energy absorbing elements to facilitate crush or failure initiation at one of the ends over the other of the ends. In an exemplary embodiment, the thickness of the energy absorbing elements may taper from between about one to three millimeters on one side and between about three to five millimeters on the opposing side. In this manner, the energy absorbing elements may provide a progressive energy absorption characteristic during an impact event. As fully described in the wholly incorporated description of U.S. patent application Ser. No. 15/907,036, the energy-absorbing elements may include a housing defining an interior compartment and an energy absorbing component that includes a polymer and a plurality of reinforcing fibers disposed within the interior compartment and fixed to the housing. In an exemplary embodiment, the energy absorbing component may form an elongate hollow structure defining a longitudinal axis extending nonparallel to at least one wall forming the housing.

Figure 5:
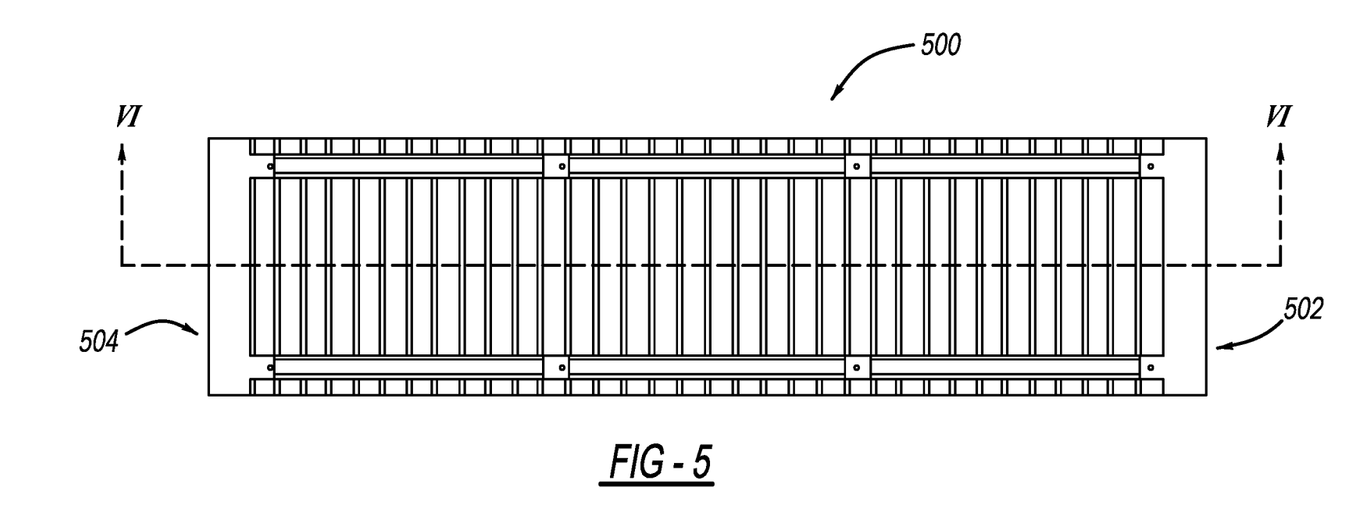
FIG. 5 illustrates a plan view of a portion 500 of the battery tray 700.
Figure 6:
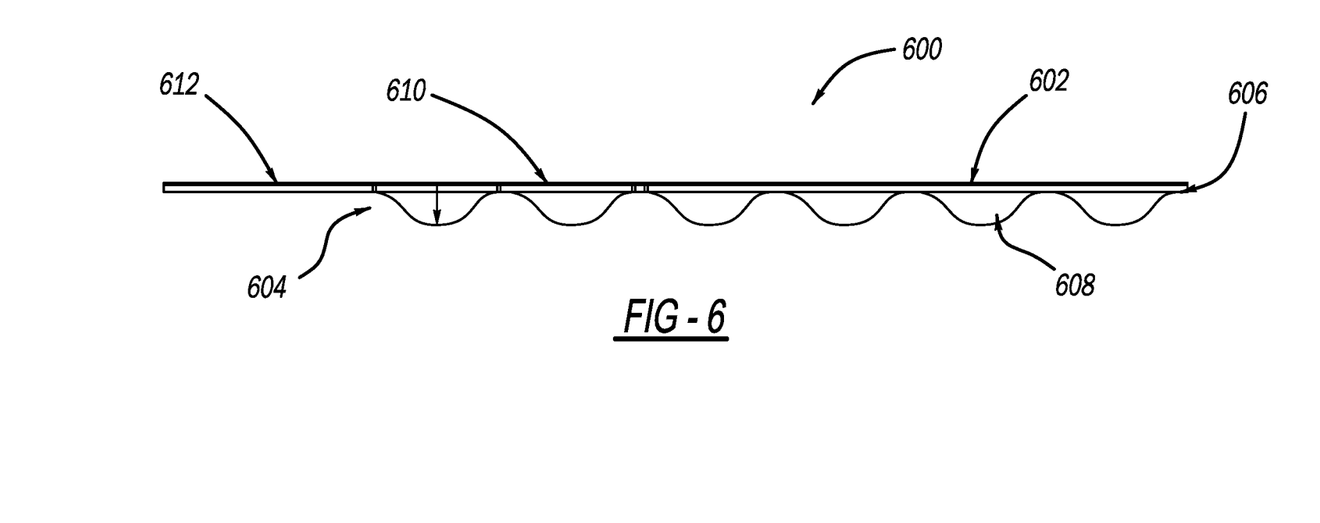
FIG. 6 is a close-up cross-sectional view of a fragment 600 of the portion 500 taken along line VI-VI.

FIG. 5 illustrates a plan view of a portion 500 of the battery tray 700. The portion 500 includes a longitudinally forward edge 502 and a longitudinally rearward edge 504. FIG. 6 is a close-up cross-sectional view of a fragment 600 of the portion 500 taken along line VI-VI. The fragment 600 has a top surface 602 and a bottom surface 604. Although FIG. 6 illustrates only a fragment 600 of a portion 500 of the battery tray 200, the construction of the fragment 600 herein described may be consistent across the entire lower floor 702 of the battery tray 700. The lower floor fragment 600 includes an upper layer 606 and a lower layer 608. The upper layer 606 is generally flat and may be formed from one or more layers. For example, the upper layer 606 may include a first layer of non-flammable fabric composed of materials such as, for example, glass, Kevlar®, and Normax fibers and a second layer of continuous fibers composed of materials such as, for example, glass and carbon fibers that are each embedded in a matrix. The lower layer 608 has a corrugated structure which includes a series of ridges having a polygonal wave geometry. In this manner, the fragment 600 forms an impact resistant structure. In an exemplary embodiment, the impact resistance structure forming the fragment 600 is described in co-pending, U.S. patent application Ser. No. 16/741,242, the disclosure of which is hereby incorporated herein in its entirety. In an exemplary embodiment the impact resistance structure forming the fragment may include an over-molded corrugated layer with continuous carbon/glass fiber reinforcement forming the upper layer 606, and discontinuous carbon/glass fiber reinforcement forming the lower layer 608. The geometry of the corrugated structure in the lower layer 608 may be adapted to the particular application to provide the desired level of energy absorption, impact protection, and/or intrusion resistance. As described in U.S. patent application Ser. No. 16/741,242, the disclosure of which is hereby incorporated herein in its entirety, the upper layer 606 may be constructed from a first (non-impact side) layer that includes continuous fibers embedded in a polymer matrix, and a second layer that is attached to a first (inboard) side of the first layer and includes an elastomeric polymer and the lower layer may be formed from a third (impact side) layer, which is attached to a second (outboard) side of the first layer opposite that of the second layer, which includes a fiber-reinforced polymer honeycomb structure and/or an FRP corrugated structure. While the referenced disclosure refers to the second layer being compressible, the second layer does not need to be compressible for the present disclosure. Further, an optional fourth (outer face sheet) layer, which may be attached to the third layer on a side opposite that of the first (inner face sheet) layer, includes continuous carbon and/or glass fibers embedded in a polymer matrix.

Optionally, the upper layer 606 may further include one or more fracture and/or temperatures sensors 610 to monitor the integrity of the structure and/or metal wires 612 embedded within the upper layer 606 to provide electromagnetic shielding.

Figure 7:
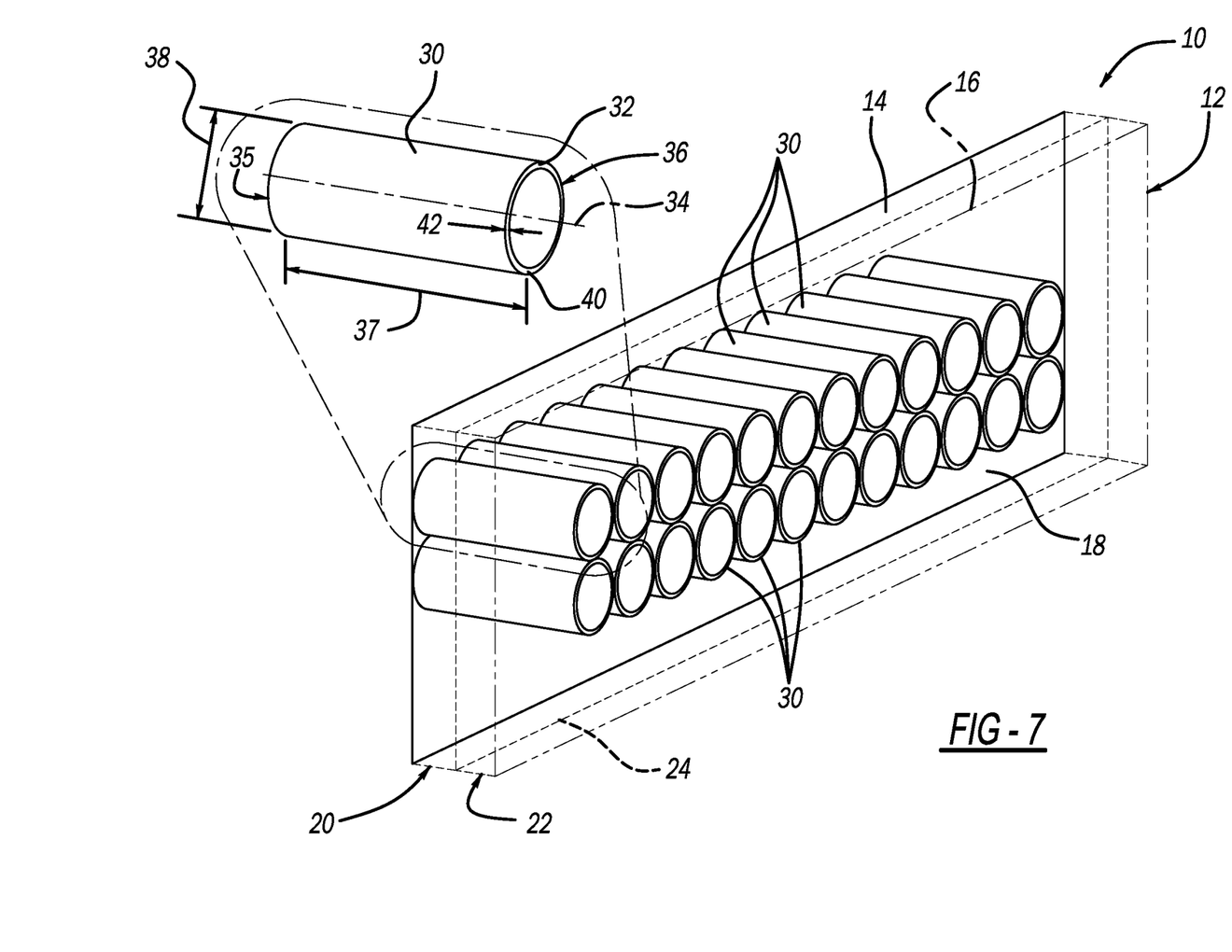
FIG. 7 is a perspective view of an energy-absorbing assembly including a plurality of discrete energy-absorbing elements according to certain aspects of the present disclosure.

FIG. 7 is a perspective view of an energy-absorbing assembly including a plurality of discrete energy-absorbing elements according to certain aspects of the present disclosure. The energy-absorbing assembly 10 may include a housing 12. The housing 12 may include a first wall 14 and a second wall 16 (shown in skeleton). The first wall 14 may be spaced apart from the second wall 16 to at least partially define an interior compartment 18. The housing 12 may include a first component 20 including the first wall 14 and a second component 22 including the second wall 16 that are joined at a seam or joint 24. The first component 20 and the second component 22 may cooperate to at least partially define the interior compartment 18. The first and second components 20, 22 are merely exemplary, and in various alternative embodiments, the housing 12 may include other quantities of components.

The second wall 16 may be disposed outward (i.e., outboard) of the first wall 14 with respect to the vehicle. The first wall 14 of the energy-absorbing assembly may be disposed closer than the second wall 16 to a center of the vehicle (i.e., a center plane extending between the front and rear of the vehicle). The first wall 14 may be closer to the rear of the vehicle than the second wall 16. The second wall 16 may be closer to the front of the vehicle than the first wall 14.

The first wall 14 may be substantially planar as shown, or the first wall 14 may alternatively be contoured. The second wall 16 may be substantially planar as shown, or the second wall 16 may alternatively be contoured based on desired performance or appearance characteristics of the energy-absorbing assembly 10. The first wall 14 may extend substantially parallel to the second wall 16. In various alternative aspects, the first wall 14 and the second wall 16 may extend non-parallel to one another. The first and second components 20, 22 may include different or additional features, such as flanges, ribs, and additional walls, by way of non-limiting example. The energy-absorbing assembly 10 may further include a plurality of discrete energy-absorbing elements 30. The energy-absorbing elements 30 may be discontinuous such that they do not share walls with one another. Because the energy-absorbing elements 30 are distinct components, the configuration and placement of energy-absorbing elements 30 can be optimized for anticipated crush or load conditions. The energy-absorbing elements 30 can be optimized by changing the size, shape, and/or distribution of energy-absorbing elements 30. Each of the energy-absorbing elements 30 may include an elongated hollow structure 32 defining a longitudinal axis 34. The elongated hollow structure 32 may extend between a first end 35 of the energy-absorbing element 30 and a second end 36 of the energy-absorbing element 30 opposite the first end 35. The first end 35 and the second end 36 may be open. In various aspects, the energy-absorbing element 30 may be symmetric about the longitudinal axis 34. The energy-absorbing elements 30 may be fixed to the housing 12. The energy-absorbing elements 30 may be fixed to at least one of the first wall 14 and the second wall 16. In one example, the respective first ends 35 of the energy-absorbing elements 30 are fixed to the first wall 14. The respective longitudinal axes 34 of the energy-absorbing elements 30 may extend substantially perpendicular to the first wall 14. Where the first wall 14 is contoured or curved, the longitudinal axes 34 may extend substantially normal to a tangent plane of the curve. In certain variations, the respective longitudinal axes 34 of the energy-absorbing elements 30 extend substantially parallel to one another.

Figure 8:
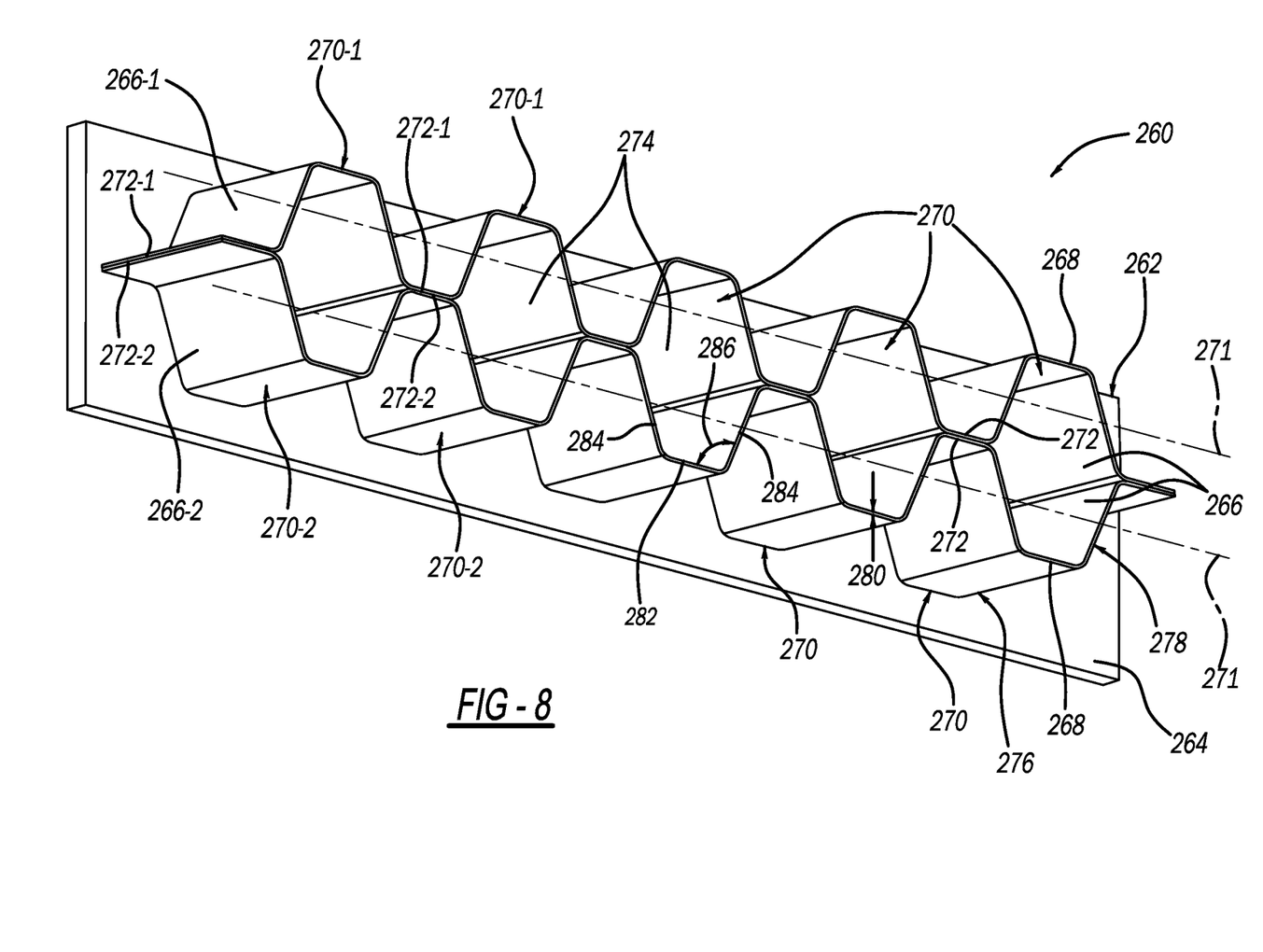
FIG. 8 illustrates a portion of another energy-absorbing assembly 260 according to certain aspects of the present disclosure.

FIG. 8 illustrates a portion of another energy-absorbing assembly 260 according to certain aspects of the present disclosure. The energy-absorbing assembly 260 may include a housing 262 having a first wall 264. Although only the first wall 264 is shown, the housing 262. The energy-absorbing assembly 260 may include a plurality of energy-absorbing elements 266. Each energy-absorbing element 266 may be formed from or include a polymer and a plurality of reinforcing fibers. Each energy-absorbing element 266 may include a transverse wall 268 that extends across at least a portion of the housing 262. In various aspects, the respective transverse walls 266 may extend through an interior compartment of the housing 262. The transverse wall 268 of each respective energy-absorbing element 266 may include a center plane 271. The center plane 271 of the transverse wall 268 may extend substantially normal to the first wall 264. The center plane 271 of the transverse wall 268 may extend substantially parallel to the ground. The transverse wall 268 of each energy-absorbing element 266 may define a plurality of elongated ridges or peaks 270. Each elongate ridge 270 of the plurality of elongated ridges may be spaced apart from other elongated ridges 270 of the plurality of elongated ridges at predetermined intervals. The transverse wall 268 of each of the energy-absorbing elements 266 may define a corrugated structure. Each elongate ridge 270 may extend substantially perpendicular to the first wall 264. A plurality of elongate floors or valleys 272 may be disposed may be disposed between the plurality of elongated ridges 270 such that the elongated ridges 270 and the elongate floors 272 alternate with one another. In various aspects, the elongated ridges 270 and the elongate floors 272 may define a waveform shape. The plurality of elongated ridges 207 may define a periodic profile. However, in various alternative aspects, the elongated ridges 270 may repeat at irregular intervals. Orientations of adjacent energy-absorbing elements 260 may be mirrored so that elongate cells 274 are formed between two energy-absorbing elements 266. More particularly a first energy-absorbing element 266-1 of the plurality of energy-absorbing elements may include first elongated ridges 270-1 and first elongate floors 272-1. A second energy-absorbing assembly 266-2 may include second elongated ridges 270-2 and second elongate floors 272-2. The first elongated ridges 270-1 of the first energy-absorbing element 266-1 may be aligned with the second elongate floors 272-2 of the second energy-absorbing element 266-2 to define the elongate cells 274. Similarly, the first elongate floors 272-1 of the first energy-absorbing element 266-1 may be aligned with the second elongated ridges 270-2 of the second energy-absorbing element 266-2. The first elongate floors 272-1 may engage the second elongated ridges 270-2.

Each energy-absorbing element 266 may extend between a first end 276 and a second end 278. The second end 278 may be disposed outward of the first end 276 with respect to the vehicle. The transverse wall 268 of each energy-absorbing element 266 may define a thickness 280. The thickness 280 may be uniform as shown in FIG. 10. In various alternative aspects, the thickness 280 may vary between the first end 276 and the second end 278. More particularly, a first thickness at the first end 276 may be greater than a second thickness at the second end 278 to facilitate crush or failure initiation at the second end 278 prior to the first end 276. As appreciated by those skilled in the art, transverse walls of an energy-absorbing element can define alternate or additional geometries. As non-limiting examples, the transverse wall may define a flat plate or a smooth waveform (e.g., a sine wave). The transverse walls may alternatively omit the elongated ridges and elongate floors altogether to define a substantially planar geometry. The energy-absorbing elements of the plurality may also be differently arranged within the housing. For example, the energy-absorbing element may be disposed so that the elongated ridges are aligned with the respective elongated ridges of other energy-absorbing elements of the plurality. Moreover, the energy-absorbing elements may be spaced apart or nested to build thickness. The energy-absorbing elements may include different or additional features, such as a flange for mounting the energy-absorbing element to the housing.

The forming of the battery tray in accordance with the present application may include, for example, compression molding, resin transfer mold (RTM), high-pressure resin transfer molding (HP-RTM), vacuum assisted resin transfer molding (VARTM), vacuum assisted resin infusion (VARI), injection molding, wet layup molding, autoclave molding, or any other suitable composites manufacturing method known to those skilled in the art without limitation.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:
1. A battery tray for a battery enclosure for a vehicle, the battery tray comprising:
   a lower floor comprising an impact resisting structure, wherein the impact resisting structure comprises:
     a first layer including continuous fibers embedded in a polymeric matrix;
     a second layer attached to a first side of the first layer and including flame resistant fibers; and
     a third layer attached to a second side of the first layer, opposite the first side, and including a fiber-reinforced polymer (FRP) corrugated structure;
   upwardly sloping side walls integrally formed with the lower floor; and
   a peripheral flange integrally formed with the upwardly sloping side walls and comprising an energy absorbing structure.

2. The battery tray of claim 1, wherein the upwardly sloping side walls define at least one pair of grooves.

3. The battery tray of claim 2, wherein each of the pair of grooves are defined by opposing walls of the upwardly sloping side walls.

4. The battery tray of claim 2, wherein the at least one pair of grooves are configured to receive at least one reinforcing cross-member.

5. The battery tray of claim 1, further comprising a fracture detection circuit attached to the first layer or the third layer and configured to detect a break in the impact protection structure.

6. The battery tray of claim 5, wherein the fracture detection circuit includes an engineered pattern of electrical wires laminated to or embedded within the first layer.

7. The battery tray of claim 1, wherein the third layer includes the FRP corrugated structure, the FRP structure including a series of elongated, mutually parallel ridges.

8. The battery tray of claim 7, wherein the series of elongated, mutually parallel ridges has a sinusoidal-waveform profile or a polygonal-waveform profile.

9. The battery tray of claim 1, wherein the energy absorbing structure comprises:
   a housing comprising a first wall and a second wall, the first wall and the second wall being spaced apart from one another to at least partially define an interior compartment; and
   a first plurality of discrete energy-absorbing elements each comprising a polymer and a plurality of reinforcing fibers, the first plurality of energy-absorbing elements being at least partially disposed within the interior compartment and fixed to the housing, each energy-absorbing element of the first plurality of energy-absorbing elements comprising an elongated hollow structure extending between a first end and a second end, the elongated hollow structure defining a longitudinal axis extending nonparallel to at least one of the first wall and the second wall.

10. The battery tray of claim 9, wherein the respective longitudinal axes of the first plurality of energy-absorbing elements extend substantially normal to at least one of the first wall and the second wall.

11. The battery tray of claim 9, wherein the elongated hollow structure of each energy-absorbing element of the first plurality of energy-absorbing elements defines a substantially circular cross section in a direction perpendicular to the respective longitudinal axis.

12. The battery tray of claim 9, wherein a peripheral wall of the elongated hollow structure of each energy-absorbing element of the first plurality of energy-absorbing elements defines a thickness that varies along the longitudinal axis.

13. The battery tray of claim 12, wherein:

the peripheral wall of the elongated hollow structure of each energy-absorbing element of the first plurality of energy-absorbing elements defines a first thickness at the first end; and the peripheral wall of the elongated hollow structure of each energy-absorbing element of the first plurality of energy-absorbing elements defines a second thickness at the second end, the second thickness being less than the first thickness, and the second end being disposed outward of the first end with respect to the vehicle.

14. A vehicle including a battery enclosure including a battery tray, the battery tray comprising:

a lower floor comprising an impact resisting structure;

upwardly sloping side walls integrally formed with the lower floor; and a peripheral flange integrally formed with the upwardly sloping side walls and comprising an energy absorbing structure, wherein the energy absorbing structure comprises:

a housing comprising a first wall and a second wall, the first wall and the second wall being spaced apart from one another to at least partially define an interior compartment; and a first plurality of discrete energy-absorbing elements each comprising a polymer and a plurality of reinforcing fibers, the first plurality of energy-absorbing elements being at least partially disposed within the interior compartment and fixed to the housing, each energy-absorbing element of the first plurality of energy-absorbing elements comprising an elongated hollow structure extending between a first end and a second end, the elongated hollow structure defining a longitudinal axis extending nonparallel to at least one of the first wall and the second wall.

15. The vehicle of claim 14, wherein the upwardly sloping side walls form at least one pair of grooves.

16. The vehicle of claim 15, wherein each of the pair of grooves are formed in opposing walls of the upwardly sloping side walls.

17. The vehicle of claim 15, wherein the at least one pair of grooves are configured to receive at least one reinforcing cross-member.

18. The vehicle of claim 14, wherein the impact resisting structure comprises:

a first layer including continuous fibers embedded in a polymeric matrix;

a second layer attached to a first side of the first layer and including flame resistant fibers; and a third layer attached to a second side of the first layer, opposite the first side, and including a fiber-reinforced polymer (FRP) corrugated structure.

* * * * *